Sept. 3, 1968     D. L. WOOD     3,399,746
REMOVABLE STRUCTURE CLIMBING DEVICE
Filed Nov. 28, 1966
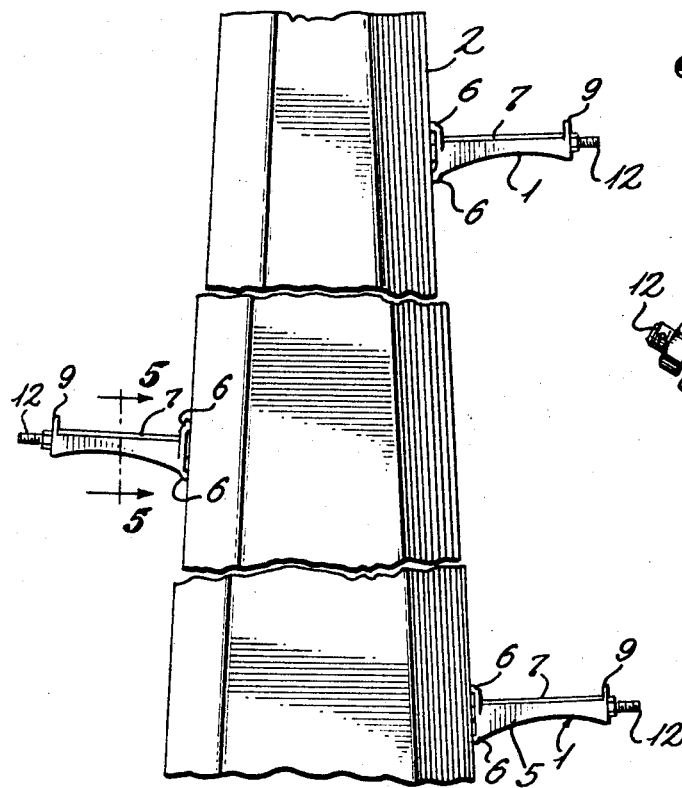
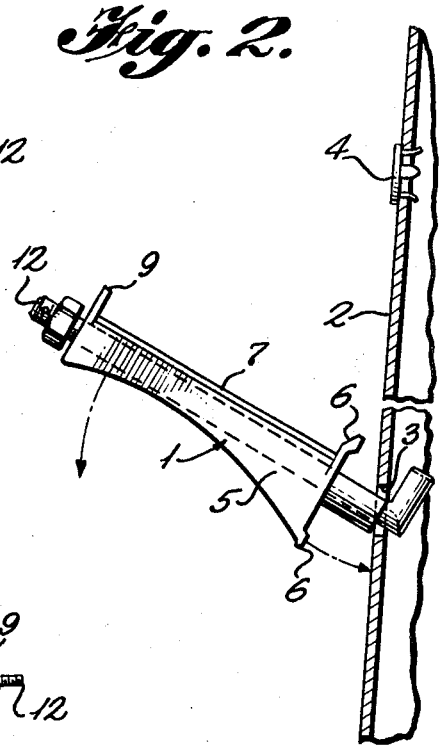
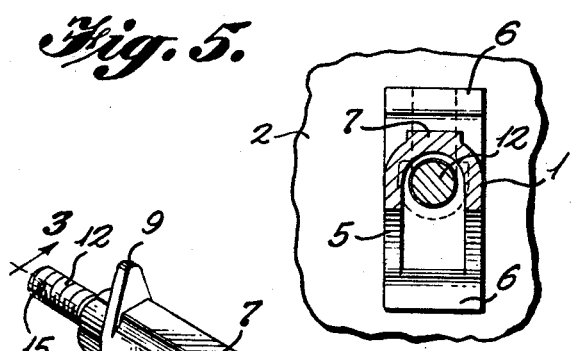
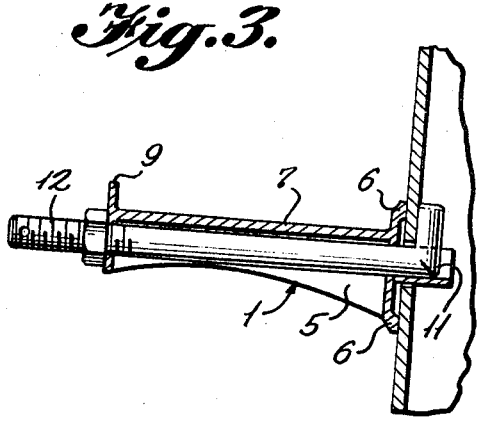
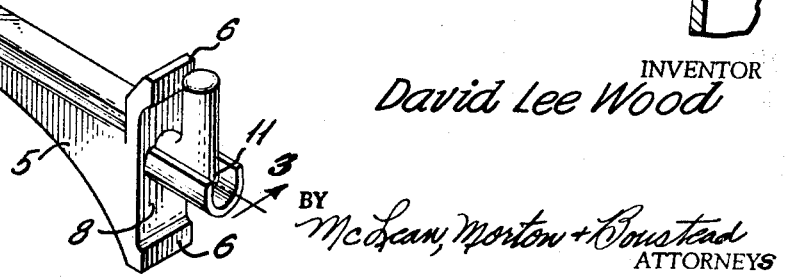
INVENTOR
David Lee Wood
BY McLean, Morton + Boustead
ATTORNEYS

United States Patent Office 3,399,746
Patented Sept. 3, 1968

3,399,746
REMOVABLE STRUCTURE CLIMBING DEVICE
David Lee Wood, Houston, Tex., assignor to Universal Pole Bracket Corporation
Filed Nov. 28, 1966, Ser. No. 597,305
2 Claims. (Cl. 182—92)

ABSTRACT OF THE DISCLOSURE

A removable apparatus for climbing structures which have a load bearing thin wall surface with an aperture therein. The apparatus contains a hooked rod which goes through the aperture and means for drawing the apparatus against the structure.

Summary of invention

This improved removable structure climbing device fits all sizes and thicknesses of hollow metallic transmission poles because of its adjustable tightening feature. Likewise the forged hook and the reinforcing collar add greatly to the load bearing capacity of the device.

Background of invention

Removable steps have been used for many years in connection with telegraph and lighting poles. An early example of this is shown in Patent No. 459,844, issued on Sept. 22, 1891. The removable step was an integral piece of metal which slid into a bracket, itself screwed into the wooden pole.

Brief description of drawings

FIGURE 1 is an elevation of three removable step climbing devices attached to a transmission pole with an octagonal tapered shaft;

FIGURE 2 shows the method of attaching the removable step climbing device to the transmission pole;

FIGURE 3 is a section of the removable step climbing device taken on lines 3—3 of FIGURE 4;

FIGURE 4 shows the removable step climbing device in perspective;

FIGURE 5 is a section of the removable step climbing device taken on lines 5—5 of FIGURE 1.

Detailed description

The removable structure climbing device 1 is shown attached to a distribution pole 2 having tapered octagonal sides of the type made by Universal Pole Bracket Corporation, Houston, Tex.

As desired, holes 3 are formed into the wall of the pole at points where the climbing device will be inserted. Snap-in hole covers are also provided for use when the climbing device is not being used.

The removable structure climbing device comprises a main body 5 having a two element face plate 6, a load bearing surface 7 and two side portions 8 and 9. A channel shaped reinforcing collar 10 extends from side 8.

A freely slideable rod 11 is attached to the main body 5 by passing it through holes in the two end plates 8 and 9. The hole in plate 8 opens into the channel of collar 10. The end of the rod 11 disposed in this channel has an upturned hook portion 12 which is forged with sufficient metal across its stress points to absorb the strain put on the device during use.

The far end of rod 11 contains a threaded portion 12 onto which a nut 13 is placed. After these three elements have been assembled, the end of the threaded portion may be deformed, for instance, by depression 15 to prevent the nut from coming off the end of rod 11 and thereby prevent rod 11 from becoming disengaged from the main body 5 of the climbing device.

In operation the nut is unthreaded enough so the hook may slide through the hole 3 in the structure wall. The nut is then tightened until face plates 6 are firmly pressing against one side of the wall and the hooked portion is pressing against the other side of the wall.

I claim:
1. A structure for line installations comprising:
   a tubular line pole having a relatively thin wall provided with a hole therein;
   an elongated body extending generally horizontally outwardly from said pole and having an upwardly projecting outer end portion, an upwardly projecting inner end portion defining a face plate engaging the outside of said wall, and an upwardly facing, load bearing surface extending between said end portions, whereby the latter and said surface define a generally U-shaped step,
   said body having longitudinally extending passage means therethrough registering with said hole;
   means removably attaching the step to said pole, including an elongated rod extending through said passage means into said hole and having an upturned hook engaging the inside of said wall, and fastening means on said rod remote from said hook and engaging said outer end portion of the body to clamp the wall between the face plate and the hook upon tightening of said fastening means; and
   a generally channel shaped retainer rigid with said inner end portion of the body, extending into said hole and receiving said rod at said hook, whereby to prevent the rod and hook from rotating during attachment of the step to the pole.
2. A structure as claimed in claim 1,
   said wall having a number of said holes therein vertically spaced from one another and arranged in staggered relationship on opposite sides of the pole,
   there being a plurality of said steps and a plurality of said attaching means for respective steps securing the latter to the wall at corresponding holes.

References Cited

UNITED STATES PATENTS

| 338,528 | 3/1886 | Hyde | 182—189 |
| 907,483 | 12/1908 | Ette | 182—189 |
| 1,211,992 | 1/1917 | Winter | 182—189 |
| 2,332,477 | 10/1943 | Thornley | 182—87 |

FOREIGN PATENTS

| 469,304 | 7/1937 | Great Britain. |

REINALDO P. MACHADO, Primary Examiner.

PO-1050
(5/69)

UNITED STATES PATENT OFFICE
CERTIFICATE OF CORRECTION

Patent No. 3,399,746      Dated October 6, 1969

Inventor(s) DAVID LEE WOOD

It is certified that error appears in the above-identified patent and that said Letters Patent are hereby corrected as shown below:

The assignor of this patent should be shown as -- A. B. Chance Company -- instead of "Universal Pole Bracket Corporation."

SIGNED AND
SEALED
FEB 17 1970

(SEAL)
Attest:

Edward M. Fletcher, Jr.
Attesting Officer

WILLIAM E. SCHUYLER, JR.
Commissioner of Patents